(12) United States Patent
Cooley et al.

(10) Patent No.: US 11,549,431 B2
(45) Date of Patent: Jan. 10, 2023

(54) TURBINE HOUSING OF A TURBOCHARGER

(71) Applicant: BorgWarner Inc., Auburn Hills, MI (US)

(72) Inventors: Matthew Brian Cooley, Asheville, NC (US); Kai Tanaka, Mills River, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 17/465,321

(22) Filed: Sep. 2, 2021

(65) Prior Publication Data

US 2021/0396171 A1    Dec. 23, 2021

Related U.S. Application Data

(63) Continuation of application No. 16/713,704, filed on Dec. 13, 2019, now Pat. No. 11,131,234.
(Continued)

(51) Int. Cl.
  *F02B 37/18* (2006.01)
  *F01D 25/24* (2006.01)
  *F02C 6/12* (2006.01)

(52) U.S. Cl.
  CPC ............ *F02B 37/183* (2013.01); *F01D 25/24* (2013.01); *F02C 6/12* (2013.01)

(58) Field of Classification Search
  CPC ........ F02B 37/183; F02B 37/00; F01D 25/24; F01D 9/026; F01D 17/105; F02C 6/12; F05D 2220/40
  See application file for complete search history.

(56) References Cited

U.S. PATENT DOCUMENTS 5,046,317 A * 9/1991 Satokawa ............. F02B 37/183
                                                    415/151
8,191,368 B2    6/2012 Garrett et al.
(Continued)

FOREIGN PATENT DOCUMENTS

| EP | 0401615 A1 | 12/1990 |
| JP | 2007120396 A | 5/2007 |
| JP | 2015175345 A | 10/2015 |

OTHER PUBLICATIONS

English language abstract and machine-assisted English translation for JP 2007-120396 extracted from espacenet.com database on Dec. 19, 2019, 9 pages.
(Continued)

*Primary Examiner* — Audrey B. Walter
*Assistant Examiner* — Edward Bushard
(74) *Attorney, Agent, or Firm* — Howard & Howard Attorneys PLLC

(57) ABSTRACT

A turbocharger includes a turbine housing. The turbine housing includes a turbine inlet wall defining an inlet passage, an exducer shroud wall defining an exducer interior, a turbine outlet wall defining an outlet passage, a wastegate port wall defining a wastegate channel, and a bushing wall coupled to the wastegate port wall and defining a bushing boss extending along a bushing axis, and a valve seat disposed about the wastegate channel. The turbocharger also includes a wastegate assembly. The wastegate assembly includes a valve element engageable with the valve seat. The wastegate port wall is disposed outside of the exducer interior such that the wastegate port wall and the bushing wall are configured to be thermally decoupled from the turbine inlet wall and such that relative displacement between the valve seat and the bushing axis is reduced during operation of the turbocharger.

20 Claims, 6 Drawing Sheets

Related U.S. Application Data

(60) Provisional application No. 62/782,784, filed on Dec. 20, 2018.

(56) References Cited

U.S. PATENT DOCUMENTS

| | | |
|---|---|---|
| 8,820,709 B2 | 9/2014 | Lombard et al. |
| 2011/0011085 A1* | 1/2011 | Garrett .................. F01D 17/167 |
| | | 415/157 |
| 2020/0200072 A1 | 6/2020 | Cooley et al. |

OTHER PUBLICATIONS

English language abstract and machine-assisted English translation for JP 2015-175345 extracted from espacenet.com database on Dec. 19, 2019, 17 pages.

\* cited by examiner

TURBINE HOUSING OF A TURBOCHARGER

CROSS-REFERENCE TO RELATED APPLICATION

The subject application is a continuation of U.S. patent application No. 16/713,704 filed on Dec. 13, 2019, which claims priority to U.S. Provisional Application No. 62/782,784 filed on Dec. 20, 2018.

BACKGROUND OF THE INVENTION

1. Field of the Invention

The present invention generally relates to a turbine housing and, more specifically, to a turbocharger including a wastegate assembly and the turbine housing.

2. Description of the Related Art

Turbochargers receive exhaust gas from an internal combustion engine and deliver compressed air to the internal combustion engine. Turbochargers are used to increase power output of the internal combustion engine, lower fuel consumption of the internal combustion engine, and reduce emissions produced by the internal combustion engine. Delivery of compressed air to the internal combustion engine by the turbocharger allows the internal combustion engine to be smaller, yet able to develop the same or similar amount of horsepower as larger, naturally aspirated internal combustion engines. Having a smaller internal combustion engine for use in a vehicle reduces the mass and aerodynamic frontal area of the vehicle, which helps reduce fuel consumption of the internal combustion engine and improve fuel economy of the vehicle.

Conventional turbochargers include a turbine housing. The turbine housing includes a turbine inlet wall defining an inlet passage in fluid communication with the internal combustion engine for receiving exhaust gas from the internal combustion engine, an exducer shroud wall defining an exducer interior disposed downstream of and in fluid communication with the inlet passage for receiving exhaust gas from the inlet passage, and a turbine outlet wall defining an outlet passage disposed downstream of and in fluid communication with the exducer interior for receiving exhaust gas from the exducer interior.

Conventional turbine housings additionally include a wastegate port wall defining a wastegate channel disposed downstream of and in fluid communication with the inlet passage for discharging exhaust gas from the inlet passage to the outlet passage by bypassing the exducer interior. The wastegate port wall defines a wastegate channel outlet disposed downstream of the wastegate channel for discharging exhaust gas into the outlet passage. Typical turbine housings also include a bushing wall coupled to the wastegate port wall, with the bushing wall defining a bushing boss extending along a bushing axis. The bushing wall is spaced from the turbine inlet wall such that the wastegate port wall is disposed between the bushing wall and the turbine inlet wall. Conventional turbine housings further include a valve seat disposed about the wastegate channel at the wastegate channel outlet of the wastegate channel.

Typical turbochargers additionally include a wastegate assembly for controlling exhaust gas flow through the wastegate channel. Conventional wastegate assemblies include a valve element engageable with the valve seat, with the valve element being moveable between a first position for preventing exhaust gas flow from the inlet passage to the outlet passage by bypassing the exducer interior, and a second position for allowing exhaust gas flow from the inlet passage to the outlet passage by bypassing the exducer interior.

In typical turbine housings, thermal deformation of the turbine housing can cause relative movement between various features of the turbocharger, which can result in decreased performance and, at times, failure of the turbocharger. For example, movement of the valve element with respect to the valve seat due to different rates of thermal deformation of the turbine housing can lead to decreased performance in the wastegate assembly and of the turbocharger as a whole. Specifically, as the bushing wall and the wastegate port wall thermally deform with respect to each other at different rates, the valve element is no longer able to properly engage the valve seat to seal the wastegate channel, which results in decreased performance of the turbocharger and an inability of the turbocharger to operate over an entire operating range of the internal combustion engine. In particular, the valve element is unable to accurately move to the first position to seal the wastegate channel by engaging the valve seat, the rotational speed of a turbine wheel in the exducer interior is unable to reach rotational targets as a result of poor sealing of the wastegate channel, and the internal combustion engine will not meet performance targets due to poor performance of the turbocharger as a whole. These problems are caused, in part, due to wastegate port wall being disposed in the exducer shroud wall in conventional turbine housings. In other words, the exducer shroud wall couples the bushing wall to the turbine inlet wall such that the exducer shroud wall is disposed between the bushing wall and the turbine inlet wall. In such configurations, the wastegate port wall is subjected to the hottest stream of exhaust gas as a result of being disposed in the exducer interior. Having the wastegate port wall subjected to the hottest stream of exhaust gas results in the wastegate port having greater thermal deformation than the bushing wall, which results in relative movement between the valve element and the valve seat and leads to poor sealing of the wastegate channel.

As such, there remains a need to provide an improved turbine housing of a turbocharger.

SUMMARY OF THE INVENTION AND ADVANTAGES

A turbocharger for receiving exhaust gas from an internal combustion engine of a vehicle and for delivering compressed air to the internal combustion engine includes a turbine housing. The turbine housing includes a turbine inlet wall defining an inlet passage configured to be in fluid communication with the internal combustion engine for receiving exhaust gas from the internal combustion engine, an exducer shroud wall defining an exducer interior disposed downstream of and in fluid communication with the inlet passage for receiving exhaust gas from the inlet passage, and a turbine outlet wall defining an outlet passage disposed downstream of and in fluid communication with the exducer interior for receiving exhaust gas from the exducer interior. The turbine housing also includes a wastegate port wall defining a wastegate channel disposed downstream of and in fluid communication with the inlet passage for discharging exhaust gas from the inlet passage to the outlet passage by bypassing the exducer interior. The wastegate port wall defines a wastegate channel outlet disposed downstream of the wastegate channel for discharging exhaust gas into the outlet passage. The turbine housing further includes a bushing wall coupled to the wastegate port wall and defining a bushing boss extending along a bushing axis. The bushing wall is spaced from the turbine inlet wall such that the wastegate port wall is disposed between the bushing wall and the turbine inlet wall. The turbine housing also includes a valve seat disposed about the wastegate channel at the wastegate channel outlet of the wastegate channel. The turbocharger also includes a wastegate assembly for controlling exhaust gas flow through the wastegate channel. The wastegate assembly includes a valve element engageable with the valve seat. The valve element is moveable between a first position for preventing exhaust gas flow from the inlet passage to the outlet passage by bypassing the exducer interior, and a second position for allowing exhaust gas flow from the inlet passage to the outlet passage by bypassing the exducer interior. The wastegate port wall is disposed outside of the exducer interior such that the wastegate port wall and the bushing wall are configured to be thermally decoupled from the turbine inlet wall and such that relative displacement between the valve seat and the bushing axis is reduced during operation of the turbocharger.

Accordingly, the wastegate port wall being disposed outside of the exducer interior such that the wastegate port wall and the bushing wall are configured to be thermally decoupled from the turbine inlet wall and such that relative displacement between the valve seat and the bushing axis is reduced during operation of the turbocharger improves performance of the wastegate assembly and the turbocharger. Having the wastegate port wall disposed outside of the exducer interior allows the wastegate port wall to be exposed to an outer environment, which results in cooling of the wastegate port wall and reducing thermal deformation of the wastegate port wall. Reducing thermal deformation of the bushing wall and the wastegate port wall increases performance of the wastegate assembly and of the turbocharger as a whole. Specifically, as the thermal deformation of the bushing wall and the wastegate port wall is reduced, the valve element is able to improve sealing of the wastegate channel by engaging the valve seat, which results in increased performance of the turbocharger and the ability of the turbocharger to operate over an entire operating range of the internal combustion engine. In particular, the valve element is able to accurately move to the first position to seal the wastegate channel, the rotational speed of a turbine wheel in the exducer interior is able to reach rotational targets, and the internal combustion engine is able to meet performance targets due to performance of the turbocharger.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 3:
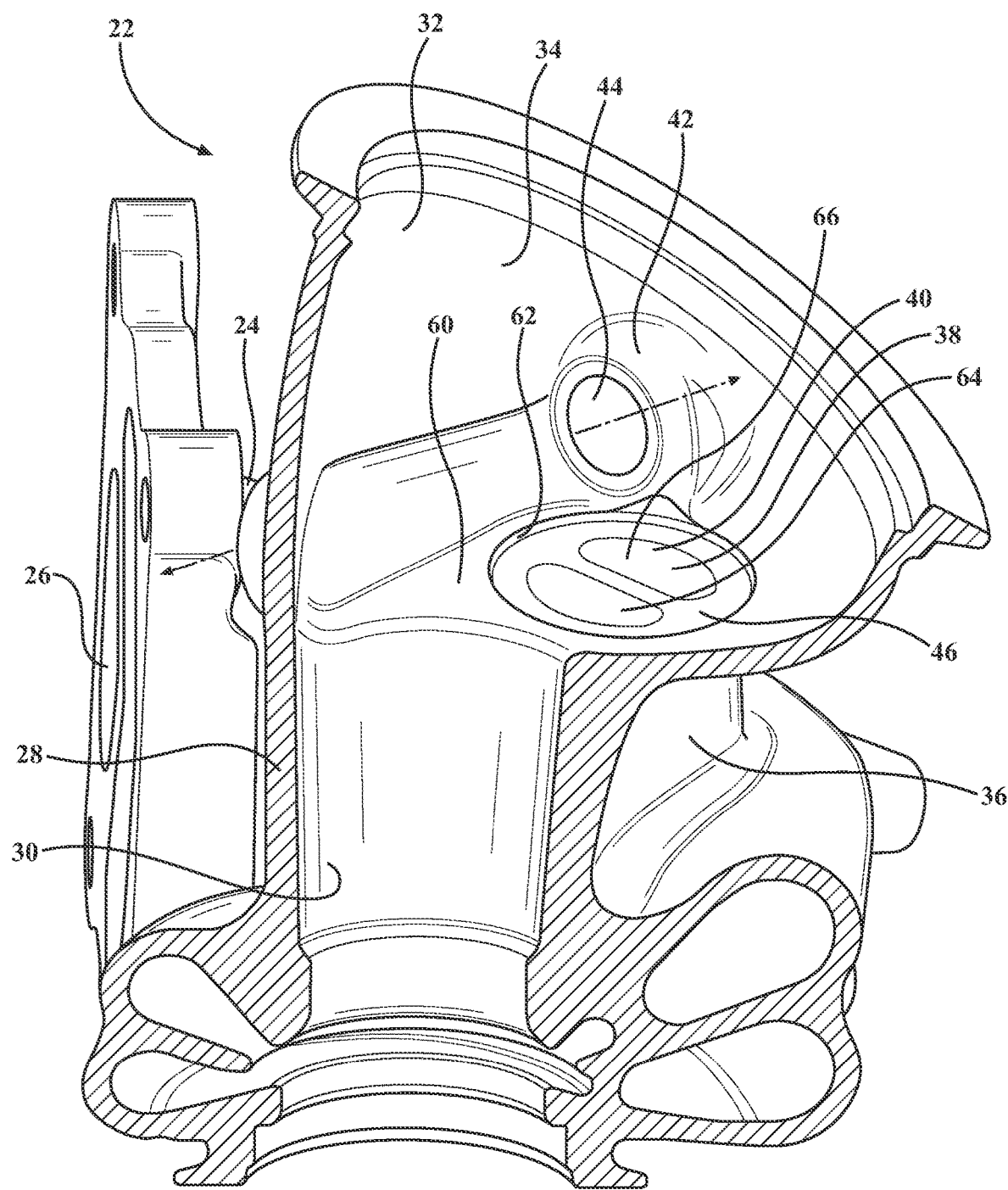
FIG. 3 is a cross-sectional view of the turbine housing, with the turbine housing including an outlet wall defining an outlet passage, and a bushing wall defining a bushing boss, and a valve seat.
Figure 4:
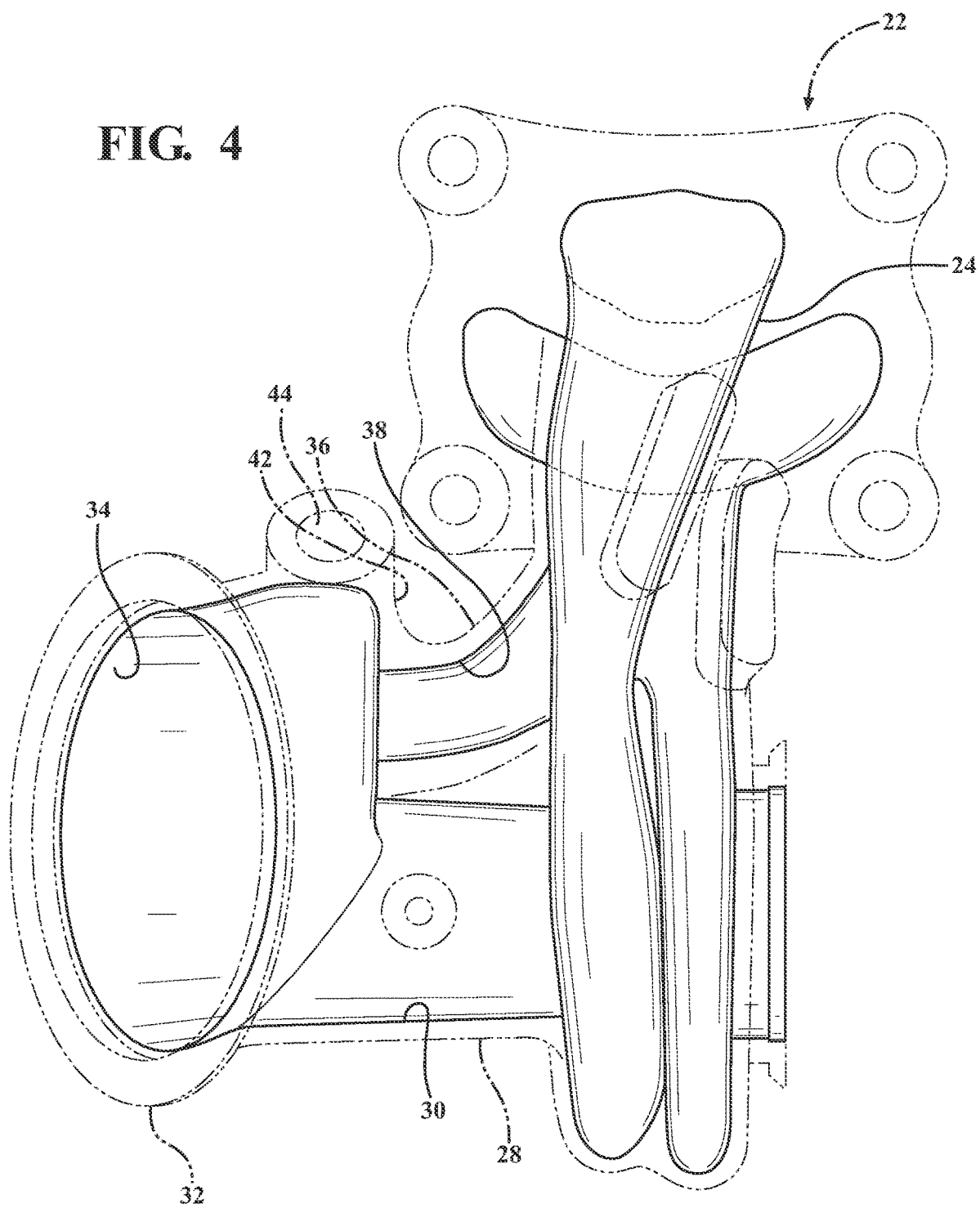
FIG. 4 is a partial phantom view of the turbine housing, with the wastegate port wall being disposed outside of the exducer interior.
Figure 5:
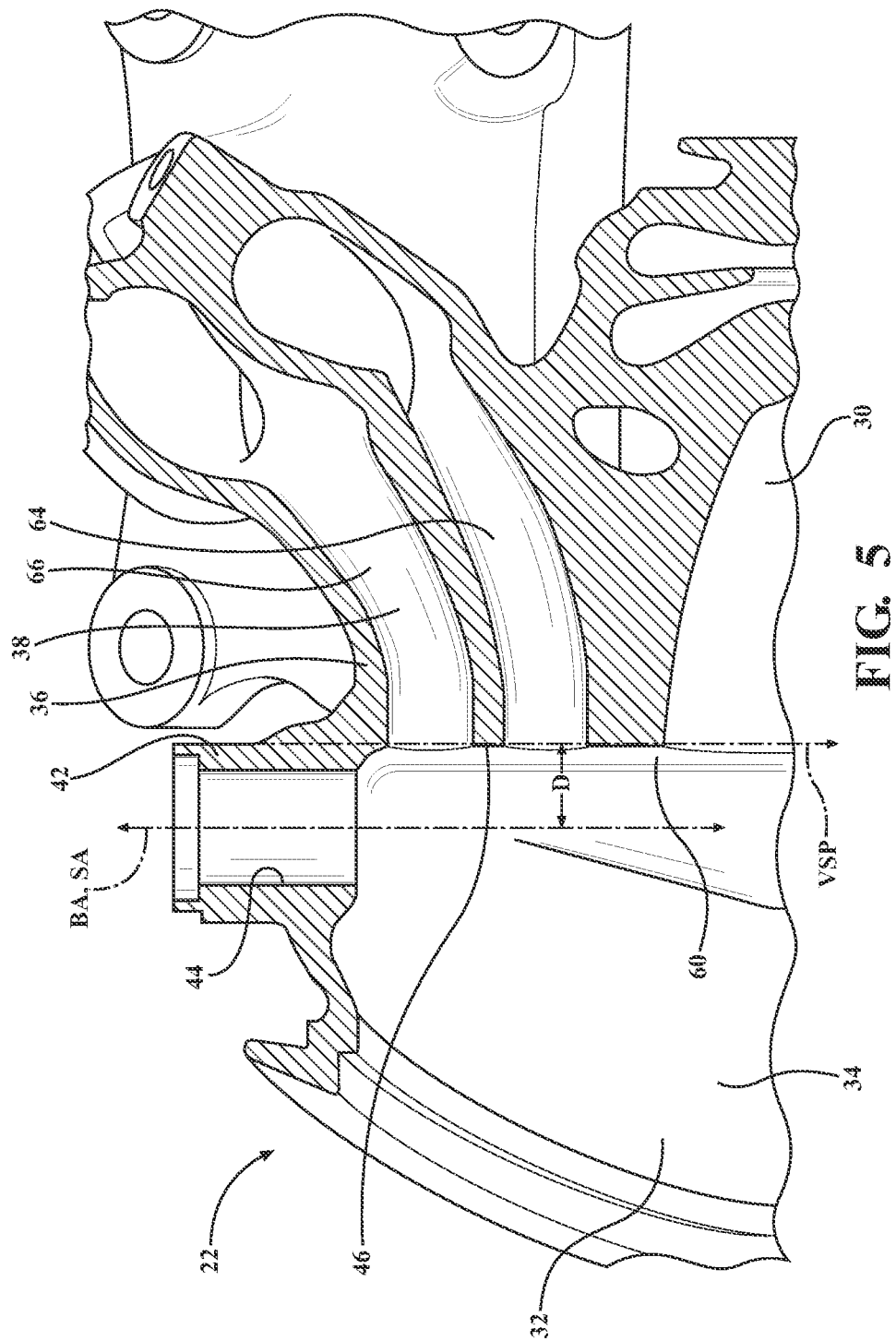
FIG. 5 is a cross-sectional view of the turbine housing, with the valve seat extending along a valve seat plane, and with the bushing axis and the valve seat plane define a distance therebetween.
Figure 6:
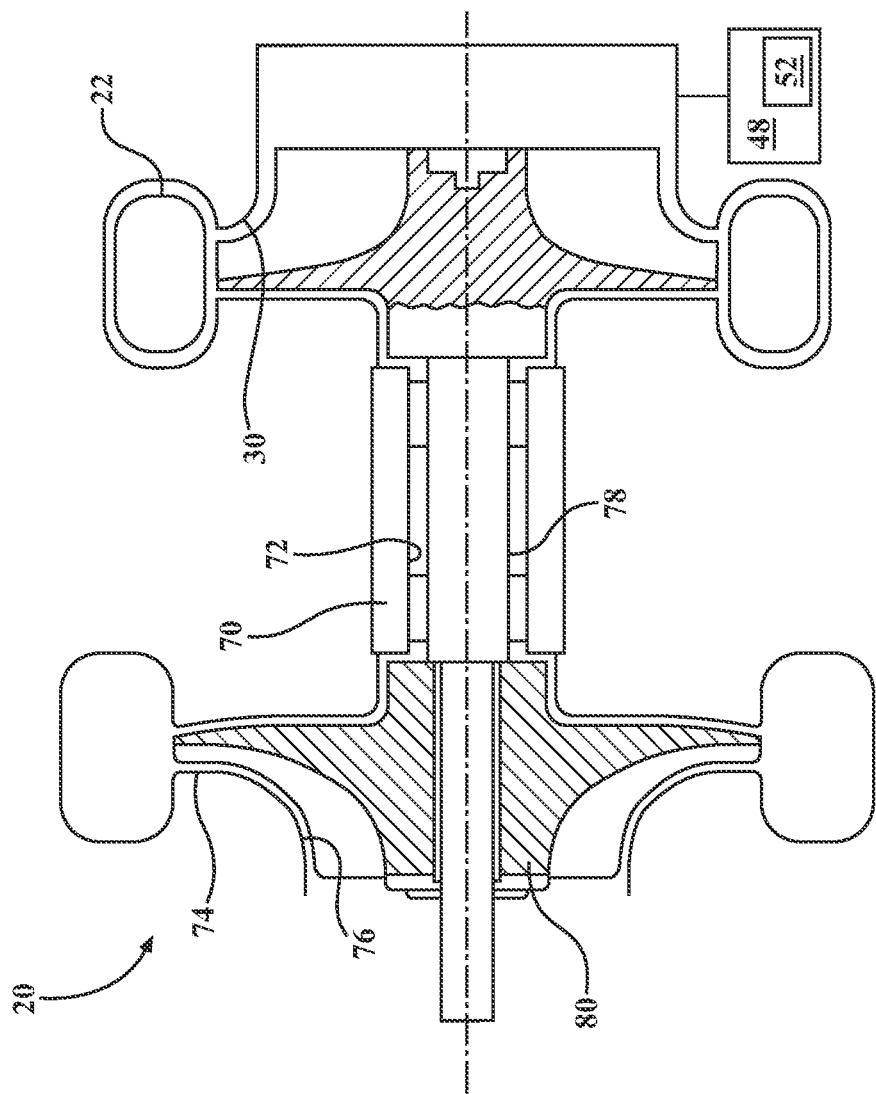
FIG. 6 is a schematic illustration of the turbocharger including a bearing housing coupled to the turbine housing and defining a bearing housing interior, a compressor housing coupled to the bearing housing and defining a compressor housing interior, a turbine wheel disposed in the exducer interior, a shaft rotatably coupled to the turbine wheel and disposed in the bearing housing interior, and a compressor wheel rotatably coupled to the shaft and disposed in the compressor housing interior.

With reference to the Figures, wherein like numerals indicate like parts throughout the several views, a turbocharger 20, which is schematically shown in FIG. 6, for receiving exhaust gas from an internal combustion engine of a vehicle and for delivering compressed air to the internal combustion engine includes a turbine housing 22, which is shown in FIGS. 1-5. With particular reference to FIG. 3, turbine housing 22 includes a turbine inlet wall 24 defining an inlet passage 26 configured to be in fluid communication with the internal combustion engine for receiving exhaust gas from the internal combustion engine. The inlet passage 26 may be a single volute inlet passage, or may be a multiple volute passage, such as a twin-scroll configuration, as shown in FIG. 5. With reference to FIGS. 1-4, the turbine housing 22 also includes an exducer shroud wall 28 defining an exducer interior 30 disposed downstream of and in fluid communication with the inlet passage 26 for receiving exhaust gas from the inlet passage 26. The turbine housing 22 further includes a turbine outlet wall 32 defining an outlet passage 34 disposed downstream of and in fluid communication with the exducer interior 30 for receiving exhaust gas from the exducer interior 30.

The turbine housing 22 additionally includes a wastegate port wall 36 defining a wastegate channel 38 disposed downstream of and in fluid communication with the inlet passage 26 for discharging exhaust gas from the inlet passage 26 to the outlet passage 34 by bypassing the exducer interior 30. The wastegate port wall 36 defines a wastegate channel outlet 40, as shown in FIG. 3, disposed downstream of the wastegate channel 38 for discharging exhaust gas into the outlet passage 34. The turbine housing 22 further includes a bushing wall 42 coupled to the wastegate port wall 36 and defining a bushing boss 44 extending along a bushing axis BA. The bushing wall 42 is spaced from the turbine inlet wall 24 such that the wastegate port wall 36 is disposed between the bushing wall 42 and the turbine inlet wall 24. The turbine housing 22 also includes a valve seat 46 disposed about the wastegate channel 38 at the wastegate channel outlet 40 of the wastegate channel 38. Typically, the valve seat 46 is disposed in the outlet passage 34.

The turbocharger 20 also includes a wastegate assembly 48 for controlling exhaust gas flow through the wastegate channel 38. The wastegate assembly 48 includes a valve element 50 engageable with the valve seat 46. The valve element 50 is moveable between a first position and a second position. When the valve element 50 is in the first position, the valve element 50 prevents exhaust gas from flowing from the inlet passage 26 to the outlet passage 34 by bypassing the exducer interior 30. When the valve element 50 is in the second position, the valve element 50 allows exhaust gas to flow from the inlet passage 26 to the outlet passage 34 by bypassing the exducer interior 30. The turbocharger 20 typically includes an actuator 52 coupled to the valve element 50 for moving the valve element 50 between the first and second positions.

The wastegate port wall 36 is disposed outside of the exducer interior 30, i.e., is disposed external to the exducer interior 30, such that the wastegate port wall 36 and the bushing wall 42 are configured to be thermally decoupled from the turbine inlet wall 24 and such that relative displacement between the valve seat 46 and the bushing axis BA is reduced during operation of the turbocharger 20. Having the wastegate port wall 36 and the bushing wall 42 thermally decoupled from the turbine inlet wall 24 typically allows the wastegate port wall 36 and the bushing wall 42 thermally expand at a lower rate than the turbine inlet wall 24 during operation of the turbocharger 20, which reduces relative displacement between the valve seat 46 and the bushing axis BA. Further, the turbine inlet wall 24 typically expands and contracts at a higher rate than the wastegate port wall 36 and the bushing wall 42 as a result of the wastegate port wall 36 being disposed outside of the exducer interior 30. As shown in FIG. 4, the turbine housing as a whole is shown in phantom, and the wastegate channel 38 and the wastegate port wall 36 are shown in solid lines and are disposed outside of the exducer interior 30.

Having the wastegate port wall 36 disposed outside of the exducer interior 30 such that the wastegate port wall 36 and the bushing wall 42 are configured to be thermally decoupled from the turbine inlet wall 24 and such that relative displacement between the valve seat 46 and the bushing axis BA is reduced during operation of the turbocharger 20 improves performance of the wastegate assembly 48 and the turbocharger 20. Specifically, thermal deformation between various features of the turbocharger 20, such as the bushing wall 42 and, in turn, the bushing axis BA, and the valve seat 46 is reduced. Having the wastegate port wall 36 disposed outside of the exducer interior 30 allows the wastegate port wall 36 to be exposed to an outer environment, which results in cooling of the wastegate port wall 36 and reducing thermal deformation of the wastegate port wall 36. Reducing relative displacement between the bushing wall 42 and, in turn, the bushing axis BA, and the wastegate port wall 36 increases performance of the wastegate assembly 48 and of the turbocharger 20 as a whole. Specifically, as the relative displacement between of the bushing axis BA and the valve seat 46 is reduced, the valve element 50 is able to improve sealing of the wastegate channel 38 by engaging the valve seat 46, which results in increased performance of the turbocharger 20 and the ability of the turbocharger 20 to operate over an entire range of the internal combustion engine. In particular, the valve element 50 is able to move to the first position to fully engage and seal the wastegate channel 38 at the proper time, the speed of a turbine wheel 68 in the exducer interior 30 is able to reach rotational targets, and the internal combustion engine is able to meet performance targets due to improved performance of the turbocharger 20.

Typically, the wastegate port wall 36 extends between the turbine inlet wall 24 and the turbine outlet wall 32. In such embodiments, the wastegate port wall 36 is typically spaced from the exducer shroud wall 28. In other words, the wastegate port wall 36 may protrude away from the turbine inlet wall 24 and the exducer shroud wall 28. Having the wastegate port wall 36 protrude away from the turbine inlet wall 24 and the exducer shroud wall 28 allows the wastegate port wall 36 to be exposed to exterior cooling air. Additionally, having the wastegate port wall 36 protrude away from the turbine inlet wall 24 and the exducer shroud wall 28 allows the wastegate port wall 36 to be disposed between and coupling the bushing wall 42 and the turbine inlet wall 24.

The bushing wall 42 may be directly coupled to the wastegate port wall 36. In other words, the bushing wall 42 is decoupled from the turbine inlet wall 24 because the wastegate port wall 36 is disposed between the bushing wall 42 and the turbine inlet wall 24. When the bushing wall 42 is directly coupled to the wastegate port wall 36, the wastegate port wall 36 is typically directly coupled to the turbine inlet wall 24. In such embodiments, the exducer shroud wall 28 does not couple the bushing wall 42 to the turbine inlet wall 24. In other words, the exducer shroud wall 28 is not disposed between the bushing wall 42 and the turbine inlet wall 24. Rather, the wastegate port wall 36 is disposed between the bushing wall 42 and the turbine inlet wall 24. Having the bushing wall 42 and wastegate port wall 36 directly coupled to one another allows the wastegate port wall 36 and the bushing wall 42 to thermally expand at the same rate during operation of the turbocharger 20. Additionally, when the wastegate port wall 36 and the bushing wall 42 are directly coupled to one another, the wastegate port wall 36 and the bushing wall 42 may be integral, i.e., one piece, with one another. When the wastegate port wall 36 and the bushing wall 42 are directly coupled to one another such that the wastegate port wall 36 and the bushing wall 42 thermally expand at the same rate during operation of the turbocharger 20, performance of the turbocharger 20, specifically through the sealing of the wastegate channel 38 by the valve element 50, is improved. Specifically, because the wastegate port wall 36 and the bushing wall 42 are able to thermally expand at the same rate during operation of the turbocharger 20, the valve element 50 is able to improve sealing of the wastegate channel 38 because the relative movement of the valve seat 46 and the bushing axis BA and, in turn, the valve element 50, with respect to one another is significantly reduced. Improved sealing of the wastegate channel 38 increases performance of the turbocharger 20, as exhaust gas passing through the wastegate channel 38 when the valve element 50 is in the first position is significantly reduced if not eliminated.

Figure 1:
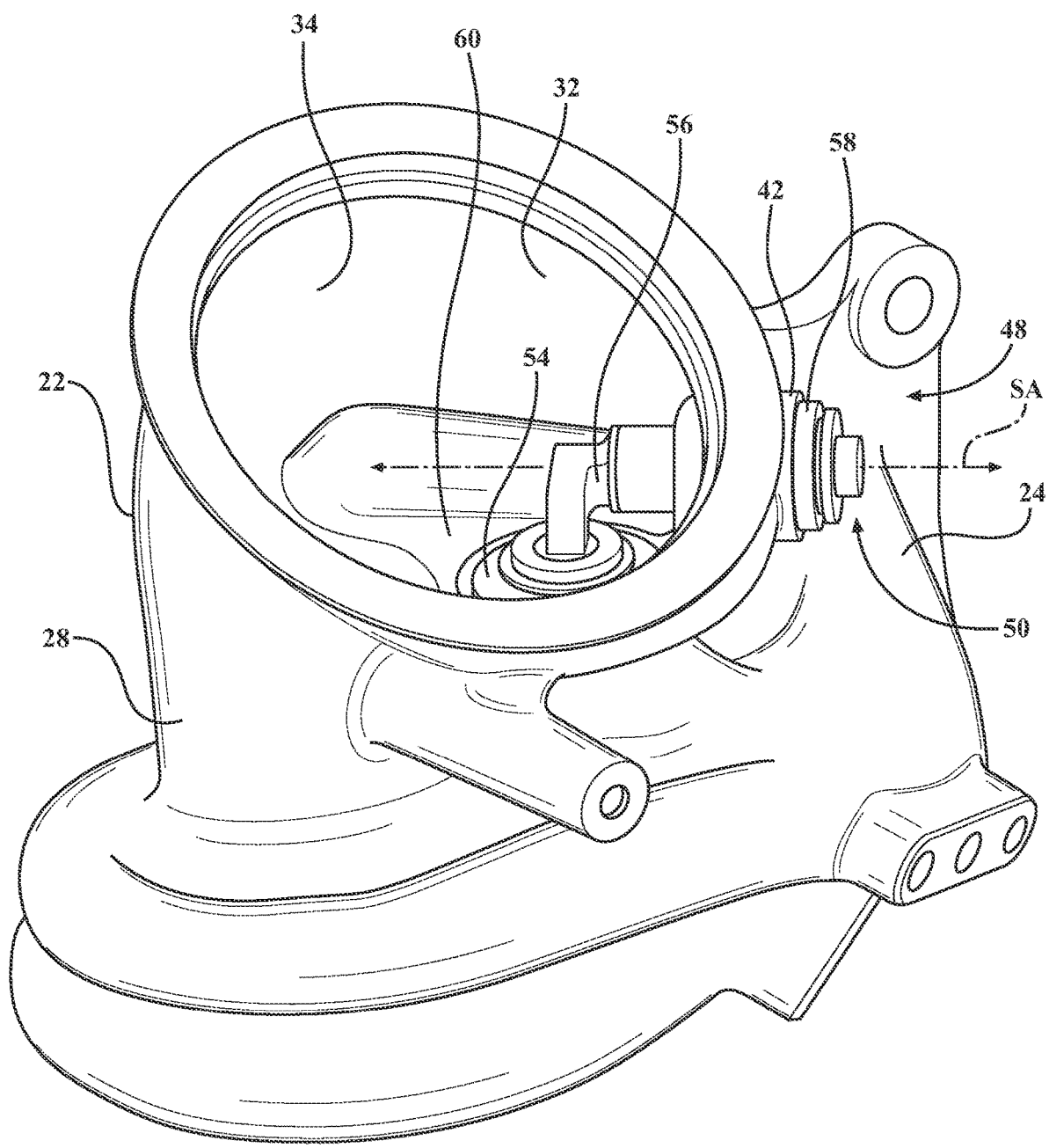
FIG. 1 is a perspective view of a turbine housing and a wastegate assembly of a turbocharger.
Figure 2:
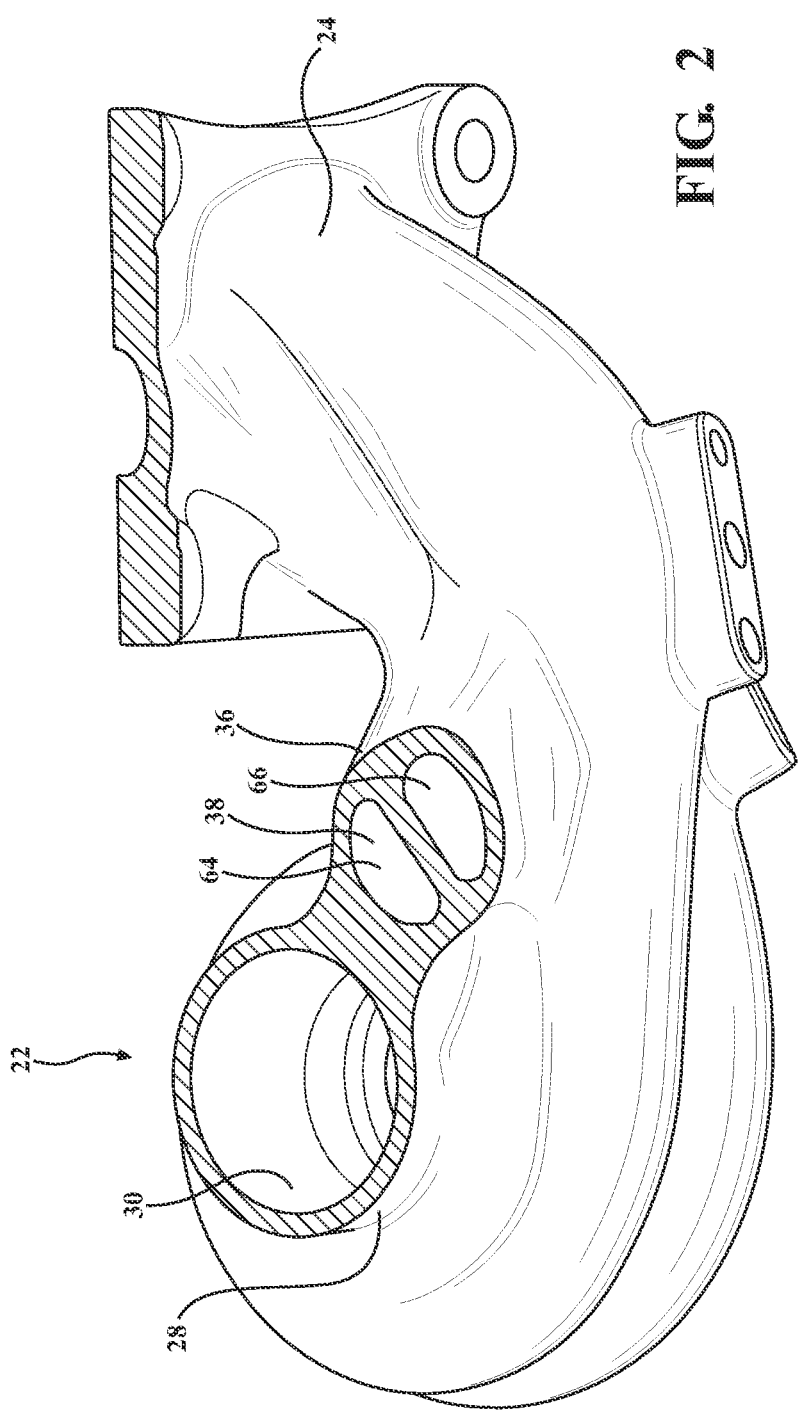
FIG. 2 is a cross-sectional view of the turbine housing, with the turbine housing including an exducer shroud wall defining an exducer interior, and a wastegate port wall defining wastegate channel.

With reference to FIG. 1, the valve element 50 may be further defined as a valve body 54 and a wastegate arm 56 extending away from the valve body 54. When present, the wastegate arm 56 extends though the bushing boss 44 and is typically rotated by a spindle (not shown) extending along a spindle axis SA. When the wastegate arm 56 extends through the bushing boss 44, the wastegate arm extends along the spindle axis SA. The wastegate assembly 48 may include a bushing 58 disposed in the bushing boss 44 for supporting the wastegate arm 56. When the valve body 54 is present, the valve body 54 is configured to engage the valve seat 46 when the valve element 50 is in the first position to prevent the flow of exhaust gas through the wastegate channel 38, and the valve body 54 is configured to be disengaged from the valve seat 46 when the valve element 50 is in the second position to allow the flow of exhaust gas through the wastegate channel 38. Typically, the actuator 52 is coupled to the wastegate arm 56 for moving the valve body 54 between engagement and disengagement with the valve seat 46.

In one embodiment, the valve body 54 and the wastegate arm 56 are rigidly coupled to one another such that the valve body 54 and the wastegate arm 56 are configured to move in unison with one another as the valve element 50 moves between the first and second positions. In embodiments where the wastegate arm 56 is rigidly coupled to the valve body 54, the wastegate arm 56 may be welded to the valve body 54. When the valve body 54 and the wastegate arm 56 are rigidly coupled to one another, having the wastegate port wall 36 disposed outside of the exducer interior 30, and having the wastegate port wall 36 and the bushing wall 42 configured to be thermally decoupled from the turbine inlet wall 24 and reducing relative displacement between the valve seat 46 and the bushing axis BA offers several advantages.

First, because the wastegate arm 56 and the valve body 54 are rigidly coupled to one another, the need for component tolerances between the wastegate arm 56 and the valve body 54 is eliminated. To this end, design and manufacturing costs of the wastegate arm 56 and the valve body 54 are significantly reduced. In such embodiments, thermal deformation of various parts of the turbine housing 22, such as the turbine inlet wall 24, the wastegate port wall 36, and the bushing wall 42, may have an adverse effect on the ability of the valve element 50 to properly seal the wastegate channel 38 when the wastegate arm 56 and the valve body 54 are rigidly coupled to one another. However, having the wastegate port wall 36 and the bushing wall 42 disposed outside of the exducer interior 30 such that the wastegate port wall 36 and the bushing wall 42 are configured to be thermally decoupled from the turbine inlet wall 24 and such that relative displacement between the valve seat 46 and the bushing axis BA is reduced during operation of the turbocharger 20 results in the rigidly coupled wastegate arm 56 and valve body 54 properly sealing the wastegate channel 38 despite thermal deformation of the wastegate port wall 36 and the bushing wall 42. Second, in embodiments where the bushing wall 42 and the wastegate port wall 36 are directly coupled to one another, and where the wastegate arm 56 and the valve body 54 are rigidly coupled to one another, the bushing wall 42 and wastegate port wall 36 expand and contract at the same rate. When the bushing wall 42 and the wastegate port wall 36 expand and contract at the same rate, the bushing axis BA and the valve seat 46 have minimal relative movement with respect to one another, which results in better sealing of the wastegate channel 38, as described below.

With reference to FIG. 5, the wastegate arm 56 may extend along the bushing axis BA and the valve seat 46 may extend along a valve seat plane VSP. In one embodiment, the bushing axis BA and the valve seat plane VSP define a distance D therebetween. As described above, relative movement between the valve seat 46 and the bushing axis BA is reduced as a result of the having the wastegate port wall 36 disposed outside of the exducer interior 30. When the relative movement between the valve seat 46 and the bushing axis BA is reduced, the relative movement between the wastegate arm 56 and the valve seat 46 is also reduced. As shown in FIG. 5, the wastegate port wall 36 may be directly coupled to the bushing wall 42. When the wastegate port wall 36 and bushing wall 42 are directly coupled to one another, relative displacement between the valve seat 46 and the bushing axis BA is reduced. In particular, when the wastegate port wall 36 and the bushing wall 42 are directly coupled to one another, the valve seat 46 is adjacent to the bushing wall 42 defining the bushing bore 44, which reduces relative deformation between the valve seat 46 and the bushing axis BA, as described below.

Thermal growth of various components of the turbine housing 22, such as the bushing wall 42 and the wastegate port wall 36, is governed by the formula: thermal growth=coefficient of thermal expansion*temperature*length. In this formula, length is the only parameter in the above equation that can practically be changed. In other words, the coefficient of thermal expansion is not practical to change because turbine housings are typically made of a metal, which has a high coefficient of thermal expansion, and the temperature is not practical to change because the turbine housing 22 is subjected to hot exhaust gas. To this end, as shown in FIG. 5, the distance D between the bushing axis BA and the valve seat 46 plane is shown.

Additionally, in FIG. 5, the distance D is also defined being between the spindle axis SA and the valve seat plane VSP. The distance D between the spindle axis SA and the valve seat plane VSP may be adjusted accordingly. In particular, when the wastegate port wall 36 and bushing wall 42 are directly coupled to one another, relative displacement between the valve seat 46 and the bushing axis BA is reduced because the valve seat 46 is adjacent to the bushing wall 42 defining the bushing bore 44, which reduces relative deformation between the valve seat 46 and the bushing axis BA. By way of non-limiting example, the distance D may be between 0 and 30 millimeters. By way of another non-limiting example, the distance D may be 30 millimeters or less. Having the distance D being less than 30 millimeters reduces the relative deformation between the valve seat 46 and the bushing axis BA, which, in turn, results in better sealing of the wastegate channel 38 when the valve element 50 is in the first position. By way of another non-limiting example, the distance D may be 20 millimeters or less. Having the distance D being 20 millimeters or less reduces the relative deformation between the valve seat 46 and the bushing axis BA, which, in turn, results in better sealing of the wastegate channel 38 when the valve element 50 is in the first position. By way of another non-limiting example, the distance D may be 15 millimeters or less. Having the distance D being less than 15 millimeters reduces the relative deformation between the valve seat 46 and the bushing axis BA, which, in turn, results in better sealing of the wastegate channel 38 when the valve element 50 is in the first position. By way of another non-limiting example, the distance D may be 12.5 millimeters. Having the distance D being 12.5 millimeters reduces the relative deformation between the valve seat 46 and the bushing axis BA, which, in turn, results in better sealing of the wastegate channel 38 when the valve element 50 is in the first position.

As shown in FIGS. 3 and 5, the turbine housing 22 may have a platform surface 60 extending parallel to the valve seat 46. In one embodiment, the valve seat 46 may be flush with the platform surface 60. Having the valve seat 46 being flush with the platform surface 60 helps with reducing the distance D between the bushing axis BA and the valve seat plane VSP because the wastegate port wall 36 does not extend past the platform surface 60 and into the outlet passage 34. In other embodiments, the platform surface 60 may define a recess 62. When the recess 62 is present, the valve seat 46 may be disposed in the recess 62. Having the valve seat 46 being flush with the platform surface 60, or having the valve seat 46 disposed in the recess 62, helps decrease the distance D and, therefore, reducing thermal deformation of the wastegate port wall 36 and the bushing wall 42.

As shown in FIG. 3, the wastegate channel 38 may be further defined as a first wastegate channel 64 and the wastegate port wall 36 may further define a second wastegate channel 66 in fluid communication with the inlet passage 26 for discharging exhaust gas from the inlet passage 26 by bypassing the exducer interior 30.

As shown in FIG. 6, the turbocharger 20 may include a turbine wheel 68 disposed in the exducer interior 30. The turbocharger 20 may also include a bearing housing 70 coupled to the turbine housing 22 and defining a bearing housing interior 72, a compressor housing 74 coupled to the bearing housing 70 and defining a compressor housing interior 76, a shaft 78 rotatably coupled to the turbine wheel 68 and disposed in the bearing housing interior 72, and a compressor wheel 80 rotatably coupled to the shaft 78 and disposed in the compressor housing interior 76.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A turbocharger for receiving exhaust gas from an internal combustion engine of a vehicle and for delivering compressed air to the internal combustion engine, said turbocharger comprising:
   a turbine housing comprising,
      a turbine inlet wall defining an inlet passage configured to be in fluid communication with the internal combustion engine for receiving exhaust gas from the internal combustion engine,
      an exducer shroud wall defining an exducer interior disposed downstream of and in fluid communication with said inlet passage for receiving exhaust gas from said inlet passage,
      a turbine outlet wall defining an outlet passage disposed downstream of and in fluid communication with said exducer interior for receiving exhaust gas from said exducer interior,
      a wastegate port wall defining a wastegate channel disposed downstream of and in fluid communication with said inlet passage for discharging exhaust gas from said inlet passage to said outlet passage by bypassing said exducer interior, with said wastegate port wall defining a wastegate channel outlet disposed downstream of said wastegate channel for discharging exhaust gas into said outlet passage,
      a bushing wall coupled to said wastegate port wall and defining a bushing boss extending along a bushing axis, with said bushing wall being spaced from said turbine inlet wall such that said wastegate port wall is disposed between said bushing wall and said turbine inlet wall, and
      a valve seat disposed about said wastegate channel at said wastegate channel outlet of said wastegate channel; and
   a wastegate assembly for controlling exhaust gas flow through said wastegate channel, said wastegate assembly comprising,
      a valve element engageable with said valve seat, with said valve element being moveable between a first position for preventing exhaust gas flow from said inlet passage to said outlet passage by bypassing said exducer interior, and a second position for allowing exhaust gas flow from said inlet passage to said outlet passage by bypassing said exducer interior;
   wherein said wastegate port wall is disposed outside of said exducer interior such that said wastegate port wall and said bushing wall are configured to be thermally decoupled from said turbine inlet wall and such that relative displacement between said valve seat and said bushing axis is reduced during operation of the turbocharger; and
   wherein said valve seat extends along a valve seat plane, wherein said bushing axis and said valve seat plane define a distance therebetween, and wherein said distance is 30 millimeters or less.

2. The turbocharger as set forth in claim 1, wherein said bushing wall is disposed outside of said exducer interior such that said bushing wall and said wastegate port wall are configured to be thermally coupled to one another.

3. The turbocharger as set forth in claim 1, wherein said valve seat is disposed in said outlet passage.

4. The turbocharger as set forth in claim 1, further comprising an actuator coupled to said valve element for moving said valve element between said first and second positions.

5. The turbocharger as set forth in claim 1, wherein said wastegate port wall protrudes away from said turbine inlet wall and said exducer shroud wall such that said wastegate port wall is exposed to exterior cooling air.

6. The turbocharger as set forth in claim 1, further comprising a turbine wheel disposed in said exducer interior.

7. The turbocharger as set forth in claim 1, further comprising a bearing housing coupled to said turbine housing and defining a bearing housing interior, a compressor housing coupled to said bearing housing and defining a compressor housing interior, a shaft rotatably coupled to said turbine wheel and disposed in said bearing housing interior, and a compressor wheel rotatably coupled to said shaft and disposed in said compressor housing interior.

8. The turbocharger as set forth in claim 1, wherein said distance is 20 millimeters or less.

9. The turbocharger as set forth in claim 8, wherein said distance is 15 millimeters or less.

10. The turbocharger as set forth in claim 9, wherein said distance is 12.5 millimeters or less.

11. The turbocharger as set forth in claim 1, wherein said turbine housing has a platform surface extending parallel to said valve seat plane.

12. The turbocharger as set forth in claim 11, wherein said valve seat is flush with said platform surface.

13. The turbocharger as set forth in claim 11, wherein said platform surface defines a recess, and wherein said valve seat is disposed in said recess.

14. The turbocharger as set forth in claim 1, wherein said wastegate channel is further defined as a first wastegate channel, and wherein said wastegate port wall further defines a second wastegate channel in fluid communication with said inlet passage for discharging exhaust gas from said inlet passage by bypassing said exducer interior.

15. The turbocharger as set forth in claim 14, wherein said valve seat is disposed about said first and second wastegate channels at respective channel outlets of said first and second wastegate channels.

16. The turbocharger as set forth in claim 1, wherein said wastegate port wall is disposed between and coupled to said bushing wall and said turbine inlet wall.

17. The turbocharger as set forth in claim 16, wherein said valve element is further defined as a valve body and a wastegate arm extending away from said valve body, wherein said wastegate arm extends though said bushing boss, wherein said valve body is configured to be engaged with said valve seat when said valve element is in said first position, and wherein said valve body is configured to be disengaged from said valve seat when said valve element is in said second position.

18. The turbocharger as set forth in claim 17, wherein said wastegate assembly further comprises a bushing disposed in said bushing boss for supporting said wastegate arm.

19. The turbocharger as set forth in claim 17, said valve body and said wastegate arm are rigidly coupled to one another such that said valve body and said wastegate arm are configured to move in unison with one another as said valve element moves between said first and second positions.

20. A turbine housing of a turbocharger for receiving exhaust gas from an internal combustion engine of a vehicle and for delivering compressed air to the internal combustion engine, said turbine housing comprising:
   a turbine inlet wall defining an inlet passage configured to be in fluid communication with the internal combustion engine for receiving exhaust gas from the internal combustion engine;
   an exducer shroud wall defining an exducer interior disposed downstream of and in fluid communication with said inlet passage for receiving exhaust gas from said inlet passage;
   a turbine outlet wall defining an outlet passage disposed downstream of and in fluid communication with said exducer interior for receiving exhaust gas from said exducer interior;
   a wastegate port wall defining a wastegate channel disposed downstream of and in fluid communication with said inlet passage for discharging exhaust gas from said inlet passage to said outlet passage by bypassing said exducer interior, with said wastegate port wall defining a wastegate channel outlet disposed downstream of said wastegate channel for discharging exhaust gas into said outlet passage;
   a bushing wall coupled to said wastegate port wall and defining a bushing boss extending along a bushing axis, with said bushing wall being spaced from said turbine inlet wall such that said wastegate port wall is disposed between said bushing wall and said turbine inlet wall; and
   a valve seat disposed about said wastegate channel at said wastegate channel outlet of said wastegate channel;
   wherein said wastegate port wall is disposed outside of said exducer interior such that said wastegate port wall and said bushing wall are configured to be thermally decoupled from said turbine inlet wall and such that said wastegate port wall and such that relative displacement between said valve seat and said bushing axis is reduced during operation of the turbocharger; and
   wherein said valve seat extends along a valve seat plane, wherein said bushing axis and said valve seat plane define a distance therebetween, and wherein said distance is 30 millimeters or less.

\* \* \* \* \*